Patented Oct. 10, 1944

2,359,733

UNITED STATES PATENT OFFICE 2,359,733

PROCESS FOR PRODUCING TRIARYL-
METHANE DYES

Orin Bradford Grant, Cranford, N. J., assignor to
American Cyanamid Company, New York, N. Y.,
a corporation of Maine No Drawing. Application July 30, 1940,
Serial No. 348,561

3 Claims. (Cl. 260—391)

This invention relates to an improved process for producing triarylmethane dyes.

As is well known in the art, certain triphenyl methane dyes such as crystal violet, are prepared by condensing an amino derivative of benzophenone with an aromatic amine in the presence of a suitable condensing agent such as phosphorous oxy-chloride. The reaction of the prior art was carried out by treating the derivative of benzophenone with an excess of the aromatic amine in order to keep the mixture fluid and to completely react the benzophenone.

The reaction used in preparing the triphenyl methane dyes is normally carried out at a moderately elevated temperature, for example, from 60–70° C., or even higher, up to around 90° C. It has been proposed to use a diluent in the reaction such as a hydrocarbon. This process does not give satisfactory results. The hydrocarbon is not a good solvent for the products and the reaction mass sets up hard resulting in operating difficulties and non-uniform reaction which is reflected in poorer yields.

My invention is concerned with an improved process of carrying out this reaction. According to the present process a saturated aliphatic or aromatic chlorinated hydrocarbon is used having a boiling point sufficiently high so that it may be used in the reaction without requiring either uneconomically low temperatures or resulting in excessive loss of the solvent and difficulty due to fumes where an elevated temperature is used. For practical purposes the chlorinated hydrocarbon must have a boiling point of at least 65° C. and preferably a chlorinated hydrocarbon having a somewhat higher boiling point is used. I am unable to explain why chlorinated compounds of the saturated aliphatic series and aromatic hydrocarbons are effective, whereas unsaturated aliphatic chlorinated hydrocarbons do not appear to be suitable, but such is the case. The present invention, therefore, is not limited to any theory of action.

It is unnecessary with my improved process to use more than a slight excess of the amine. This results in a lowering of the cost of the process since it is unnecessary to recover this excess amine from the finished triphenyl methane dye and also eliminates a major portion of the loss of amine in the reaction. In my improved process, because of the presence of the chlorinated hydrocarbon solvent as a diluent and the increased fluidity of the melt, local over-heating caused by the exothermic reaction is avoided. All of these factors contribute to an increased yield of the triphenyl methane dyes and a lowering of the cost of carrying out the process.

According to the preferred procedure of my invention, one part of the ketone of an aryl substituted amine is dissolved in approximately 1½ parts by weight of a chlorinated saturated aliphatic or chlorinated aromatic hydrocarbon solvent. To this solution is added slightly more than one mol equivalent, based on the ketone of the aryl substituted amine, of the condensing agent. This addition produces an exothermic reaction and it is advisable to wait until the temperature has subsided back to the starting point, between 60° and 70° C. before the addition of the aryl amine to complete the reaction. The amount of aryl amine added is preferably a little more than 1 mol equivalent, based on the ketone of the aryl substituted amine. The condensation reaction which then occurs is exothermic and produces another temperature rise, after which the temperature is held at approximately 90° C. for about 1 hour. The fluid melt is then drowned in water, the excess acid neutralized, and the solvent, together with any excess of the amino aryl compound removed by steam distillation or any other convenient method. The dye is then salted out and upon cooling is filtered and dried.

Among the solvents which I have found may be used in my improved process are s.-tetrachlorethane, 1,1,2-trichlorethane, ethylenedichloride, o-dichlorbenzene, and the like. In general, I have found that the saturated aliphatic and aromatic chlorinated hydrocarbon solvents are useful and within the scope of my invention.

EXAMPLE 1

Crystal violet 67 pounds of Michler's ketone (tetramethyl diaminobenzophenone) was charged into an enamel reaction vessel and 160 pounds of s.-tetrachlorethane added. The mixture was agitated and heated at 85° C., cooled to 65° C. and 41.9 pounds of phosphorus oxy-chloride added. The temperature rose rapidly to 96–97° C. and the reaction mass was cooled a second time to 65° C., followed by the addition of 34.5 pounds of dimethyl aniline. This resulted in a further rise in temperature and then the mass was kept at 90° C. for one hour, drowned in 800 pounds of water, and the solvent recovered by steam distillation. A small amount of residue was filtered off and the crystal violet was crystallized from the filtrate. The crystals were filtered off and dried at 70° C.

Example 2

The same procedure as described in Example 1 was carried out except that 126 pounds of ethylene dichloride were substituted for the s.-tetrachlorethane.

Example 3

144 pounds of 1,1,2-trichlorethane were used in carrying out the process of Example 1 in place of the s.-tetrachlorethane described therein. The other reactants and conditions remained the same.

Example 4

The process of Example 1 was carried out using 130 pounds of o-dichlorbenzene in place of the s.-tetrachlorethane.

Example 5

Victoria Blue R 48.7 pounds of ethyl alpha naphthylamine was substituted for the dimethylaniline used in Example 1, the other details being followed exactly as set forth therein.

Example 6

Crystal violet

In an alternative method of preparing crystal violet, 67 pounds of Michler's ketone was charged in the reaction vessel, 160 pounds of s.-tetrachlorethane and 34.5 pounds of dimethyl aniline were added in succession. The temperature was raised to 65° C. and 41.9 pounds of $POCl_3$ added to the mixture. A rapid rise of temperature to about 103° C. occurred and then the reaction was cooled to 90° C. and held at this point for one hour. Crystal violet was recovered from the filtrate as described in example 1.

Example 7

Ethyl violet 64.8 pounds of tetraethyl diaminobenzophenone was charged into an enamel reaction vessel and 155 pounds of s.-tetrachlorethane added. The mixture was agitated and refluxed at 85° C., cooled to 65° C., and 33.5 pounds of phosphorus oxy-chloride added. The temperature rose rapidly to 96–97° C. and the reaction mass was cooled a second time to 65° C., followed by the addition of 29.8 pounds of diethylaniline. This resulted in a further rise in temperature and then the mass was kept at 90° C. for one hour, drowned in 800 pounds of water, and the solvent recovered by steam distillation. A small amount of residue was filtered off and the ethyl violet was crystallized from the filtrate. The crystals were filtered off and dried at 70° C.

Example 8

Victoria Blue B 54.7 pounds of phenyl alpha naphthylamine was used in place of the dimethylaniline of Example 1; the other reactants and conditions of Example 1 were followed exactly.

In carrying out my invention the ratio of the amount of ketone to solvent used may vary considerably, the chief limitations being of economy. That is, an excess of solvent does not materially improve the fluidity of the melt and, of course, increases the recovery costs. On the other hand, sufficient solvent must be used to dissolve the reactants. The amount of condensing agent used may vary widely from the figures given above; this and the particular condensing agent used being a matter of choice. The molar ratio of the amount of aryl substituted amine to the ketone of the aryl substituted amine may vary from a little less than 1 to several times unity. However, a ratio slightly in excess of 1 is preferable in that it is sufficient to complete the reaction quickly and it is, on the other hand, unnecessary to recover a large excess from the product. The temperatures given in the examples are not critical and may vary considerably from the figures given. In the final step where the reaction mass is held at 90° C. for one hour where a higher temperature is used, it would not be necessary to hold the mass for so long a time, and where a lower temperature is used it would be advisable to hold the melt at the lower temperature for somewhat more than one hour, depending upon the exact temperature used.

As shown by a comparison of Examples 1 and 6 it is immaterial whether both of the reactants are dissolved in the chlorinated hydrocarbon solvent before the condensing agent is added or whether one of the reactants is dissolved in the solvent, then the condensing agent, and then the second reactant added to this solution.

In the examples chlorinated hydrocarbons have been described as these are the cheapest halogenated hydrocarbons and are hence preferred. Satisfactory results are, however, obtained with liquid or low melting brominated hydrocarbons but the results are not sufficiently better to justify their higher cost in practical operation. They are, however, included in the broader aspects of the invention.

Having now particularly described the nature of my invention and the manner in which the same is to be performed, what I claim is:

1. In the process for producing triphenylmethane dyes by reacting a benzophenone with a condensing agent and with a member of the group consisting of dialkyl arylamines of the benzene series, alkyl arylamines of the benzene series, and diarylamines of the benzene series, the improvement which comprises carrying out the reaction at a temperature materially above 60° C. in a chlorinated hydrocarbon solvent selected from the group consisting of chlorinated ethanes and dichlorobenzenes having a boiling point of at least 65° C. and a melting point less than 60° C.

2. In the process for producing crystal violet by reacting 4,4' bis(dimethylamino)benzophenone with a condensing agent and with N,N-dimethylaniline, the improvement which comprises carrying out the reaction at a temperature materially above 60° C. in a chlorinated hydrocarbon solvent selected from the group consisting of chlorinated ethanes and dichlorobenzenes having a boiling point of at least 65° C. and a melting point less than 60° C.

3. In the process for producing ethyl violet by reacting 4,4' bis(diethylamino)benzophenone with a condensing agent and with N,N-diethylaniline, the improvement which comprises carrying out the reaction at a temperature materially above 60° C. in a chlorinated hydrocarbon solvent selected from the group consisting of chlorinated ethanes and dichlorobenzenes having a boiling point of at least 65° C. and a melting point less than 60° C.

ORIN BRADFORD GRANT.